Aug. 30, 1932.  R. W. KING  1,874,015

VISCOSIMETER

Filed Nov. 16, 1925

INVENTOR
R. W. King
BY
ATTORNEY

Patented Aug. 30, 1932

1,874,015

UNITED STATES PATENT OFFICE

ROBERT WALDO KING, OF SHORT HILLS, NEW JERSEY

VISCOSIMETER

Application filed November 16, 1925. Serial No. 69,434.

This invention relates to devices for testing lubricants, and particularly to a device of that type adapted to indicate the condition of lubricating oil used in connection with internal combustion motors in which the oil is circulated to the moving parts continuously during operation.

In the operation of internal combustion motors, it is desirable to be able to determine the condition of the lubricating oil at any time. Methods and devices which are used in connection with laboratory tests of lubricants are impracticable for making the tests upon internal combustion motors in service. Experience shows that it is desirable to have a device forming part of the vehicle to which the motor is attached, which is capable of indicating directly the condition of the oil used in lubricating the motor.

It is the object of this invention to provide means capable of indicating directly the condition of the oil used in lubricating an internal combustion motor, the said means being readily capable of attachment to the vehicle driven by the said motor.

Figure 1:
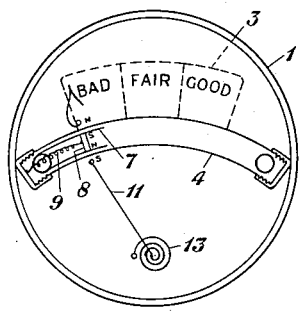
Figure 1A:
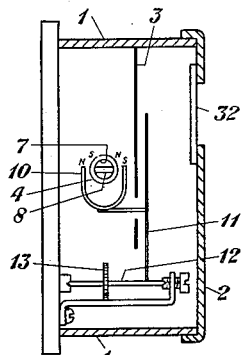
Figure 1B:
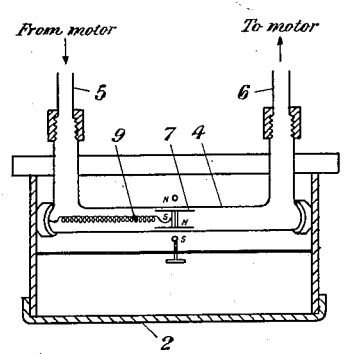
Figure 2:
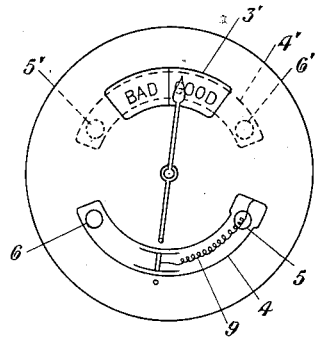
Figure 2A:
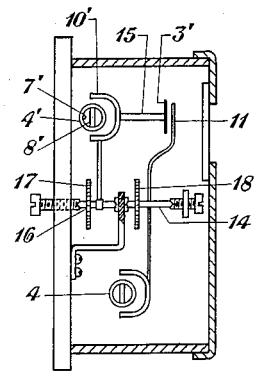
Figure 2B:
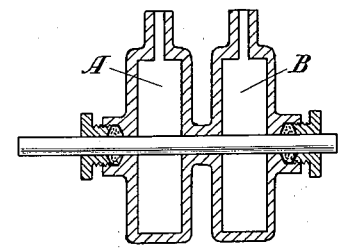
Figure 3:
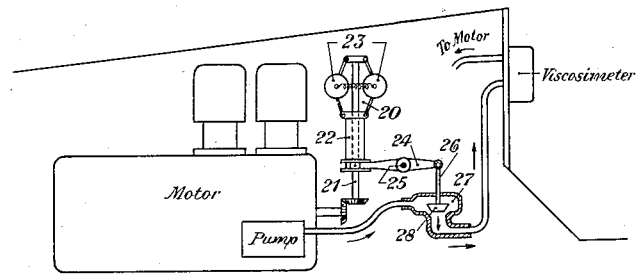

Other objects of this invention will be apparent from the following description when read in connection with the attached drawing, of which Figure 1 shows a plan view of a form of embodiment of the invention, which is calibrated at a fixed rate of flow of the oil, and which therefore must be operated with the same rate of flow when employed in testing the oil of the motor of the vehicle to which this form of instrument is attached; Fig. 1a is a vertical cross-section through Fig. 1 when the needle is in its vertical position, and Fig. 1b is a horizontal cross-section through Fig. 1; Fig. 2 is a form of embodiment of the invention in which the measurement of the lubricating quality of the oil is independent of the motor speed; Fig. 2a is a vertical cross-section through Fig. 2; Fig. 2b shows one form of the double pump which may be employed in connection with this type of meter; and Fig. 3 shows the relative position of the instrument and the motor of a motor vehicle.

As shown in Fig. 1, the device comprises a casing 1 which serves to hold the various parts of the device and also to protect them from injury. The front wall of this casing designated 2, more clearly shown in Fig. 1a, has therein a window 32. Behind this window space is a dial 3 divided, as shown, into a number of parts which are marked to designate the relative condition of the lubricant. Supported within the case in any suitable way, is a tube 4 which is connected with the oil circulating system of the motor. Thus, as may be seen from Fig. 1b, the tube 4 is connected with an inlet pipe 5 from the motor, and also with an outlet pipe 6 to the motor, so that the oil from the motor passes through the pipe 5 to the tube 4 and thence through the pipe 6 back to the oil circulation system of the motor. The tube 4 has therein a movable sleeve 7 which contains a permanent magnet 8. A spring 9 is connected with this sleeve and also with the inlet end of the tube 4 in such manner that when no fluid is passing through the tube, the sleeve will be held at the left-hand side of the tube. Another permanent magnet 10, which is shown more clearly in Figs. 1a and 1b, is attached to the needle 11 which is rotatably supported by the shaft 12. Connected with the shaft 12 is a spring 13. As will be seen from Fig. 1a, the permanent magnets 8 and 10 are so arranged that the north and south poles of 8 are in close juxtaposition to the south and north poles, respectively, of 10. It will be apparent that as the sleeve 7 moves the permanent magnet 8, which is held within the said sleeve, the permanent magnet 10, which is connected with the needle 11, will also be moved by virtue of the magnetic attraction between the two magnets.

The manner in which this device operates is undoubtedly quite apparent from the foregoing description, so that little additional information seems necessary. As is well known, the sleeve 7 within the tube 4 will be dragged along the tube whenever oil is forced from the pipe 5 through the tube 4 to the outlet pipe 6, the degree or extent of motion of the sleeve depending upon the viscosity of the oil. Light oils, that is to say, those which have been diluted or thinned through use, will flow around the sleeve and exert a smaller dragging force upon the sleeve, than will the heavier oils, viz., those undiluted or not thinned. The dragging force will move the sleeve through the tube toward its right-hand end. The extent to which the sleeve will be moved will also depend upon the rate of flow of the oil through the tube 4, which in turn depends upon the speed of the pump which is driven by the motor. With the type of meter shown in Fig. 1, a calibration test must first be performed, which consists in running the motor at a fixed speed, noting the position of the needle upon the dial 3 when the oil is in good condition. The oil will then be diluted to a known degree, which might be designated as having fair lubricating quality, and the position of the needle upon the dial 3 is then noted when oil in this condition is circulated through the tube 4. In like manner, the device is calibrated for oil in poor condition. Obviously, when the viscosimeter has been thus calibrated, if the engine is run at the calibrating speed at any subsequent time, the condition of the lubricating oil in the motor at that time will be indicated directly by the position of the needle upon the dial 3. The value of this device, particularly to the owner of an automobile, giving as it does a continuous indication of the lubricating quality of the crankcase oil, is quite apparent.

The form of the invention shown in Fig. 2, which is independent of the speed with which oil passes through it, employs two tubes, 4 and 4′, each of which is connected to its individual pump chamber. These pump chambers, designated A and B in Fig. 2b, have means therein for the purpose of forcing the oil through the pipes connected with the chambers, but for the purpose of simplicity, such means have been omitted from the drawing. The chamber A is connected with the inlet pipe 5′ of the tube 4′, and the outlet pipe 6′ returns to the inlet pipe of the same pump chamber. Similarly, the inlet pipe 5 of the tube 4 is connected with the chamber B, and the outlet pipe 6 is similarly connected. The chamber A is filled with oil which has the same lubricating quality that is possessed by new oil used in lubricating the motor, that is to say, undiluted or unthinned oil as would be used in the chamber B. The oil in A thus constitutes a standard against which the oil of the engine is compared at any time as to its lubricating qualities. The tube 4′ has therein a sleeve 7′, as will be clearly seen in Fig. 2a, which sleeve carries a permanent magnet 8′. Another permanent magnet 10′ is supported by means of the spindle 15 connected with the shaft 16 having therein a hair spring 17 adapted to move the magnet 10′ and its associated parts back to their normal position when the meter is not operating. The magnet 10′ carries a scale or dial 3′ which is movable by virtue of its connection with the magnet 10′. The tube 4 has therein a sleeve 7 comprising a permanent magnet 8 which coacts with a permanent magnet 10 connected with one end of the needle 11 which is pivoted at 14. The pivoting shaft has a hair spring 18 adapted to bring the needle back to its normal position when the meter is not operating. A spring 9 connected with the sleeve 7 serves to withdraw the sleeve 7 to the right-hand end of the tube when oil ceases flowing through the tube. It will be seen that in the tube 4 the oil flows from the inlet at the right-hand side of the tube to the outlet at the left-hand side of the tube, serving to move the sleeve from right to left. The condition is reversed in the tube 4′, the standard oil entering at the left-hand side and flowing out from the right, serving to move the sleeve in the same clockwise direction in which the sleeve 7 of the tube 4 moves. Since the chambers A and B, which supply the oil to the tubes 4′ and 4, are connected with the same driving shaft, it is therefore apparent that by the proper proportioning of the two pumps A and B and also proportioning of the piping systems connecting the pumps to the meter, the rate of flow of oil through the said tubes 4′ and 4 will always be equal. It will therefore be apparent that an instrument of the type shown in Fig. 2 will be independent of the engine's speed, and therefore will indicate the exact condition of the oil, regardless of the said speed.

It is desirable to point out that the outlet pipe 6′ connected with the tube 4′ should have such frictional resistance introduced as to give the same rate of flow of the oil as through the circulatory system connected with the chamber B when the oil in B is pure. It will be apparent that for any speed the dial 3′ will take a definite position dependent upon that speed. When the oil in the chamber B is fresh, that is to say, undiluted, the sleeve 7 will be moved to such a position that the pointer on the needle 11 will be over that part of the dial marked good. As the oil becomes diluted, its viscosity will, of course, be lowered, and the sleeve will not be carried over so far toward the left in the tube 4 for the same speed. The needle will therefore indicate the condition of the oil by its pointer resting over that part of the dial marked bad.

It is important to note that any other means of moving the dial is suitable which causes its displacement from the zero position to maintain a fixed and previously determined relationship to the speed of the motor.

The type of meter shown in Fig. 1 may be rendered independent of the motor speed by employing an auxiliary device as shown in Fig. 3 which will maintain constant the rate of flow of oil through the meter irrespective of changes in the motor speed. In Fig. 3 a governing device 20 is geared or otherwise connected with the motor shaft. This device has a spindle 21 which rotates the governing balls 23 which are connected to the sleeve 22, moving the latter up or down with variations in the speed of the spindle 21. Coacting with a groove on this sleeve is a lever 24 pivoted at 25 and connected with the stem 26 of the valve 27. The stem 26 carries a plunger 28 which is capable of varying the area of the opening in the valve. As the motor speed increases, the sleeve 22 of the governor will rise and the plunger 28 will be lowered, thus checking any increase in the rate of flow of the oil from the pump to the meter, thus tending to keep the oil flow constant and independent of motor speed. Various forms of governing devices may be employed. The form shown is simply to illustrate the invention.

While this invention has been disclosed as embodied in a particular form, it is capable of embodiment in other and different forms without departing from the spirit and scope of the appended claims.

What is claimed is:

1. In an oil testing system, the combination with an internal combustion motor having an oil circulating system connected therewith, of a viscosimeter connected with the said system and responsive to the flow of oil through the system to automatically indicate the viscosity of the oil by virtue of its flow.

2. In an oil testing system, the combination with an internal combustion motor having an oil circulating system connected therewith, of a viscosimeter connected with the said system and having means to compensate for variations in the rate of flow of the oil through it, thereby rendering the indications of the said viscosimeter independent of the speed of the motor.

3. A viscosimeter comprising a tube to be traversed continuously by the oil to be tested, means within the said tube adapted to be moved by the said oil the position of said means in said tube for any given rate of flow being dependent on its viscosity, and indicating means controlled by the said movable means to show the viscosity of the oil.

4. A vicosimeter having a movable dial and a movable needle, one controlled as to its position by the continuous flow of oil of known viscosity, and the other by oil of unknown viscosity, to indicate the viscosity of the oil irrespective of the rate of flow through the said viscosimeter.

5. A viscosimeter comprising a plurality of tubes, one of which is connected with a source of oil of known viscosity and the other with a source of oil of unknown viscosity, the rate of flow of the oil through both tubes being the same, means located within each of said tubes and movable therein, a dial operatively connected with and controlled by means associated with the tube containing the oil of known viscosity, and a needle operatively connected with and controlled by means associated with the tube containing the oil of unknown viscosity.

6. In an oil testing system, the combination with an internal combustion motor, of a pump connected therewith comprising two chambers, one of which is connected with the oil circulating system of the said motor and the second containing oil of known viscosity, and a viscosimeter having a plurality of tubes, one of which is connected with the said second chamber containing the oil of known viscosity and the second tube connected with the oil circulating system of the motor, a movable dial connected with the first tube and controlled by means responsive to the viscosity of oil flowing therethrough, and an indicating needle connected with the said second tube and controlled by means responsive to the viscosity of oil flowing therethrough, the direction of flow of the oil of known viscosity and of unknown viscosity through their respective tubes being such that the indication of the viscosity of the oil in the second tube is rendered independent of the speed of the said motor.

7. In an oil testing system, the combination with an internal combustion motor having an oil circulating system connected therewith, of a viscosimeter connected with the said system and operated by the flow of oil therethrough, and means to render the indications of the said viscosimeter independent of the speed of the motor.

8. A viscosimeter having a movable dial and a movable needle, means to govern each of said movable elements as to position responsive to the continuous flow through the said viscosimeter of oil from separate sources, means to maintain the flow through said viscosimeter of the oil from the separate sources at substantially the same rate, and the relative movement of said dial and needle being in such direction as to render the viscosity indications independent of the rate of flow.

9. In an oil testing system, the combination with an internal combustion motor having a source of lubricating oil connected therewith of a viscosimeter operating on such oil and having two movable indicators, means responsive to the flow of the said lubricating oil to control one of said indicators, and means to vary the movement of the other of said indicators in accordance with any variations in the rate of flow of the said lubricating oil, so that the combined effect or reading of the two indicates the lubricating condition of the oil independently of the rate of flow of the oil.

10. In an oil testing system, the combination with an internal combustion motor having a supply of lubricating oil, of a viscosimeter connected therewith to automatically indicate the viscosity of the said oil, the said viscosimeter having a movable dial and a movable needle, means responsive to the continuous flow through the said viscosimeter of oil of known viscosity to control the position of one of the movable elements, means responsive to the continuous flow through the viscosimeter of oil of unknown viscosity to control the position of the other movable element, the direction of motion of the dial and the needle being such as to compensate for variations in the rate of flow of the oil of known viscosity and that of unknown viscosity, and means to equalize the rate of flow of the said oils.

11. In an arrangement for determining the viscosity of a fluid comprising, in combination, a system through which a fluid of unknown viscosity is flowing, a viscosimeter connected with the said system and operated by the flow of fluid therethrough, and means to render the indiactions of the said viscosimeter substantially independent of the rate of flow of the fluid through the said system.

12. An arrangement for determining the viscosity of a fluid comprising, in combination, a system through which a fluid of unknown viscosity is flowing at a known velocity, a viscosimeter connected with the said system and responsive to the flow of fluid therethrough, the said viscosimeter having been calibrated for a fluid of known viscosity at a known velocity, and means to maintain the velocity of the fluid of unknown viscosity through the viscosimeter always substantially equal to that at which the viscosimeter was calibrated, whereby the viscosity of the fluid under test may be automatically indicated by virtue of its flow.

13. An arrangement for determining the viscosity of a fluid comprising, in combination, a source of fluid of unknown viscosity, a source of fluid of known viscosity, a viscosimeter having two movable elements, namely a dial and a needle, one of said elements being controlled as to its movements by the flow through the viscosimeter of fluid from one of the said sources, and the other element being controlled by the flow through the viscosimeter of fluid from the other source, and means to substantially equalize the rate of flow of the said fluids through the viscosimeter.

14. In an oil testing system, the combination with an internal combustion motor having a source of lubricating oil connected therewith of a viscosimeter connected with the said source, and means interposed between said source and said viscosimeter and controlled by said motor to render the rate of supply of said oil to said viscosimeter substantially constant and independent of the motor speed.

15. In an oil testing system, the combination with an internal combustion motor of a source of lubricating oil, a pump driven by said motor to supply said oil to said motor, a viscosimeter connected with said pump and calibrated at a fixed rate of flow of oil therethrough to indicate the condition of said oil, and a governing device connected between said pump and said viscosimeter and controlled by said motor to maintain the rate of flow of the oil through said viscosimeter the same as that at which it is calibrated regardless of variations in motor speed.

In testimony whereof, I have signed my name to this specification this 6th day of November, 1925.

ROBERT WALDO KING.